US008453609B2

(12) United States Patent
McCann

(10) Patent No.: US 8,453,609 B2
(45) Date of Patent: Jun. 4, 2013

(54) PET TOY HAVING A TREAT DISPENSER ARRANGED IN A CONFIGURATION WHICH FACILITATES TOSSING THE PET TOY INTO THE AIR

(75) Inventor: Thomas McCann, Weston, CT (US)

(73) Assignee: Innovative Design & Sourcing, LLC

( * ) Notice: Subject to any disclaimer, the term of this patent is extended or adjusted under 35 U.S.C. 154(b) by 26 days.

(21) Appl. No.: 13/029,746

(22) Filed: Feb. 17, 2011

(65) Prior Publication Data

US 2012/0152180 A1   Jun. 21, 2012

Related U.S. Application Data

(60) Provisional application No. 61/424,370, filed on Dec. 17, 2010.

(51) Int. Cl.
*A01K 29/00* (2006.01)
(52) U.S. Cl.
USPC .......................................... 119/709; 119/711
(58) Field of Classification Search
USPC ................. 119/702, 707, 708, 709, 710, 711, 119/51.01; 446/46, 48; 473/588, 589; D30/160
See application file for complete search history.

(56) References Cited

U.S. PATENT DOCUMENTS

| 2,835,073 | A | * | 5/1958 | Dame | 446/48 |
|---|---|---|---|---|---|
| 3,852,910 | A | * | 12/1974 | Everett | 446/46 |
| 4,075,781 | A | * | 2/1978 | Hill et al. | 446/48 |
| 5,522,753 | A | * | 6/1996 | McGraw | 446/36 |
| 5,819,690 | A | * | 10/1998 | Brown | 119/707 |
| 6,073,588 | A | * | 6/2000 | McClung et al. | 119/709 |
| 6,129,053 | A | * | 10/2000 | Markham et al. | 119/710 |
| 6,405,682 | B1 | * | 6/2002 | Simon | 119/707 |
| 7,424,866 | B1 | * | 9/2008 | Tsengas | 119/707 |
| 7,513,220 | B2 | * | 4/2009 | Ragonetti et al. | 119/707 |
| 8,113,150 | B1 | * | 2/2012 | Tsengas | 119/711 |
| 2001/0047770 | A1 | * | 12/2001 | Pontes | 119/707 |
| 2005/0115517 | A1 | * | 6/2005 | Wolfe et al. | 119/707 |
| 2006/0048718 | A1 | * | 3/2006 | Mann | 119/710 |
| 2007/0068464 | A1 | * | 3/2007 | Smith et al. | 119/709 |
| 2009/0133639 | A1 | * | 5/2009 | Ottosson | 119/707 |
| 2009/0314221 | A1 | * | 12/2009 | Wang | 119/707 |

* cited by examiner

*Primary Examiner* — T. Nguyen
(74) *Attorney, Agent, or Firm* — Baker & Hostetler LLP

(57) ABSTRACT

The pet toy of the present invention comprises a light weight body and a pet treat dispenser for dispensing a treat to a pet animal upon accessing the pet toy with the pet treat dispenser affixed to the body at a location at or substantially close to the center of gravity of the pet toy and comprising a flexible material divided into at least two sections with each section including one or more layers of flexible material extending from a border area surrounding the perimeter of the pet treat dispenser such that the flexible layer(s) form a plurality of flaps for removably gripping the pet treat.

18 Claims, 6 Drawing Sheets

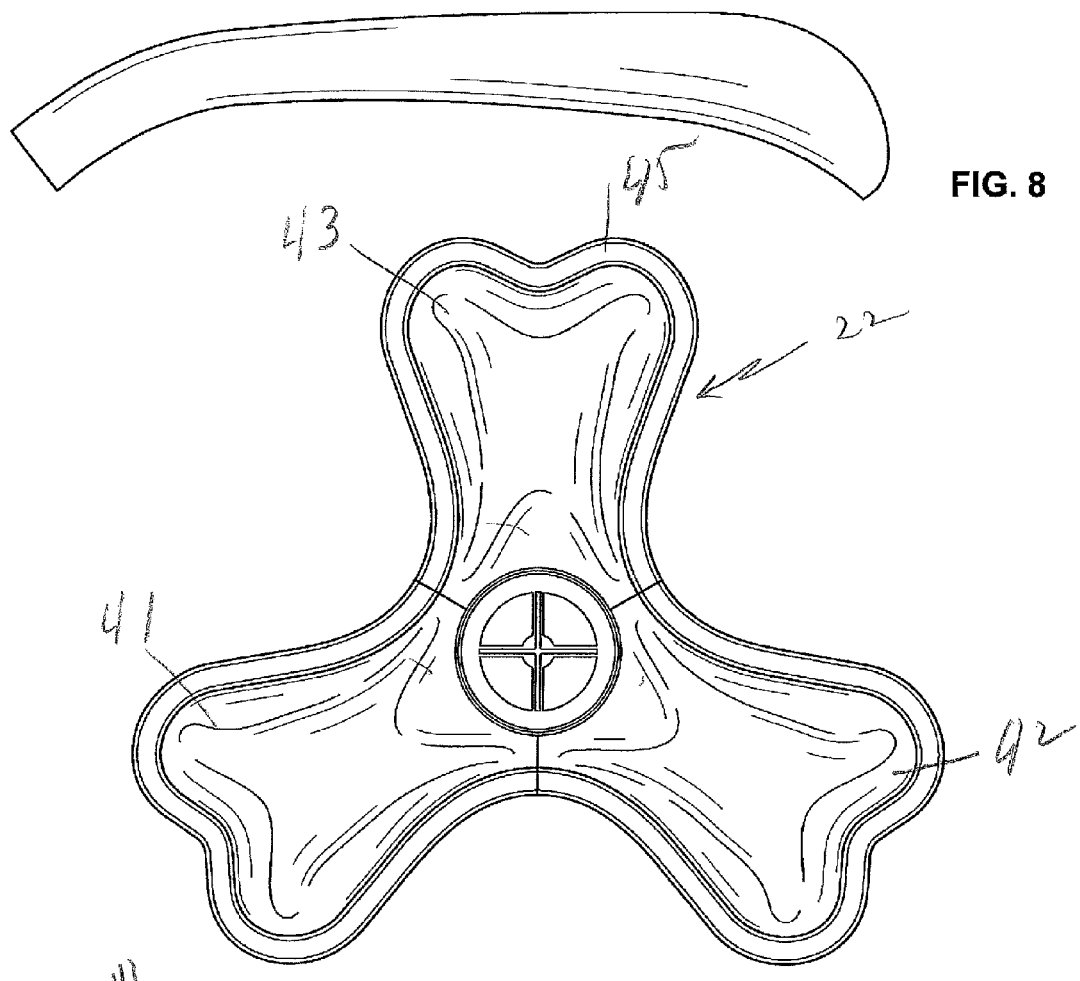
FIG. 8
FIG. 9
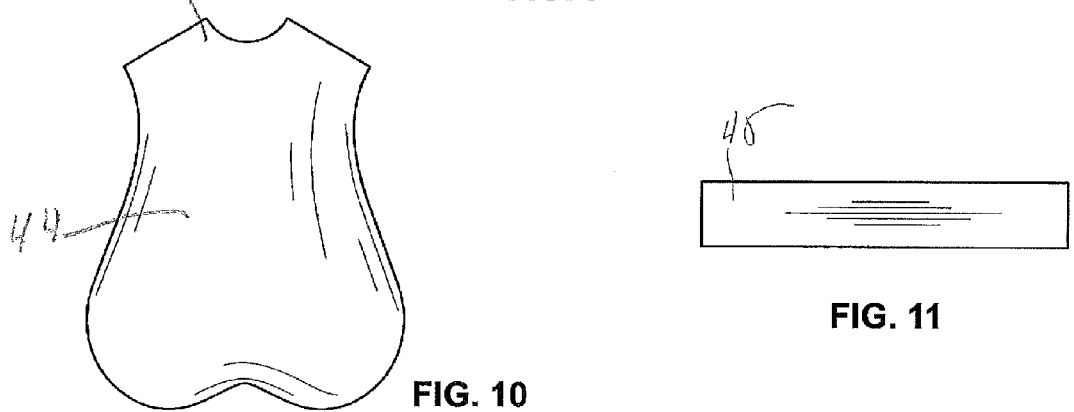
FIG. 10
FIG. 11

PET TOY HAVING A TREAT DISPENSER ARRANGED IN A CONFIGURATION WHICH FACILITATES TOSSING THE PET TOY INTO THE AIR

FIELD OF THE INVENTION

This invention relates to a pet toy having a treat dispenser for dispenser a treat to a pet animal and having a configuration adapted to facilitate tossing the pet toy into the air such that the pet animal is motivated to perform physical exercise to gain access to the treat.

BACKGROUND ART

There are many pet toys which incorporate a pet treat in the toy and require the pet animal to manipulate the toy to gain access to the treat. However, such toys are, in reality, passive devices providing essentially no exercise to the pet animal in association with the removal of the treat from the toy. A pet toy which incorporates a pet treat in a passive device will retain the treat in an accessible location and hold the treat in such manner to enable the pet to access and remove the treat from the toy without requiring the pet animal to destroy the toy to remove the treat. However, such passive pet toy devices do not motivate the pet to perform exercise as an integral part of providing access to a treat. Any exercise performed by a pet animal in a passive device is so minimal that it is not considered physical exercise for purposes of this application.

The pet toy of the present invention is designed as a tossing device adapted to be thrown into the air so that the pet animal is required to chase after the toy and perform physical exercise before gaining access to the treat. Upon accessing the treat, the pet animal is also motivated to retrieve the toy and bring it back to the owner or animal handler so that the toy can again be thrown into the air after a new treat is placed into the toy and the process repeated.

The pet toy of the present invention comprises a body having a pet treat dispenser composed of a flexible material adapted to removably grip a treat in such manner that the treat is easily removed from the treat dispenser by a pet animal without destroying the toy and permits a new treat to be reinserted into the treat dispenser by the owner or pet handler of the pet toy. More particularly, the body of the pet toy should possess a geometry which facilitates hurling the pet toy into the air with the treat holder located within the body at or substantially at its center of gravity. The body of the pet toy may have any geometrical configuration which will facilitate hurling the pet toy into the air selected from the group consisting of an annular ring or diskette shape geometry, a boomerang shape geometry which may represent a quadrant of a circle and a geometry which includes a central body having a plurality of arms of preferably three or four which extend from the body and are preferably radially arranged. The body of the pet toy exclusive of the treat holder should be composed of relatively light weight fabric material, preferably of nylon, in any desired geometrical configuration to facilitate hurling the toy into the air.

The pet treat dispenser or holder should be located at or substantially at the center of gravity of the pet toy, viz., at a central or near central location approximating the center of gravity independent of the geometrical configuration of the pet toy. The treat dispenser should be composed of flexible plastic or a rubberized material having one or more sheet-like layers of flexible but relatively stiff plastic or rubber attached to each other preferably adjacent to the perimeter of each sheet. The sheet-like layers should be divided into sections forming divided panels of rubber or flexible plastic so that the divided panel sections extend from the perimeter of the sheets of plastic or rubber material. The preferred geometry of the treat holder may be circular. In this case the divided panels may be divided into quadrants of four panels although a plurality of panels of any number is acceptable. The sheet-like layers are preferably attached to one another only around a border area bounded by the perimeter of the sheets. This results in the divided panels forming independent flaps which readily enable a treat to be gripped between the flaps and to be easily removed therefrom by a pet animal. The sheets should be attached to one another by overlapping them at their perimeter with fabric or section of fabric extending from the body of the pet toy. The fabric or section of fabric extending from the body of the pet toy should be placed between the sheets before the sheets are attached. The attachment may be accomplished by sewing the edges of the sheets along the perimeter to the fabric or section of fabric of the pet toy. This arrangement interconnects the pet treat dispenser to the body of the pet toy and keeps the sheets separated from one another so that the divided sections are separated enabling the flaps to better grip a treat and to hold onto it until a pet animal tries to remove it from the treat dispenser.

The preferred configurations for the body of the pet toy of the present invention is exemplified by a plurality of styles as shown in the drawings.

BRIEF DESCRIPTION OF DRAWINGS

FIG. 8 illustrates a fabric part for placement over the edge of the body of the boomerang of FIG. 7 permitting the edge to be sewn to the body of the boomerang with a cotton filling inserted therein along the edge;

FIG. 9 is a top plan view of yet another embodiment of the pet toy of the present invention with the body of the pet toy having three arm like sections of fabric radially extending from a pet treat holder as shown in FIG. 1 located in the center of the body of the pet toy and with each of the arms formed of several overlapping layers of fabric stitched together along its periphery after filling each arm with cotton;

FIG. 10 illustrates one layer of fabric for forming any one of three arms of FIG. 9 in a preferred pattern to facilitate hurling the pet toy of FIG. 9 into the air;

FIG. 11 illustrates a section of fabric to be stitched to two layers of fabric shown of FIG. 10 for forming any one of three arms of FIG. 9 to reinforce the edges of the arms and permit each arm to be filled with cotton;

FIG. 1 shows a preferred pet treat dispenser or holder 10 for the pet toy of the present invention with the dispenser 10 preferably in a circular geometry. However, a circular geometry is not essential.

Figure 1:
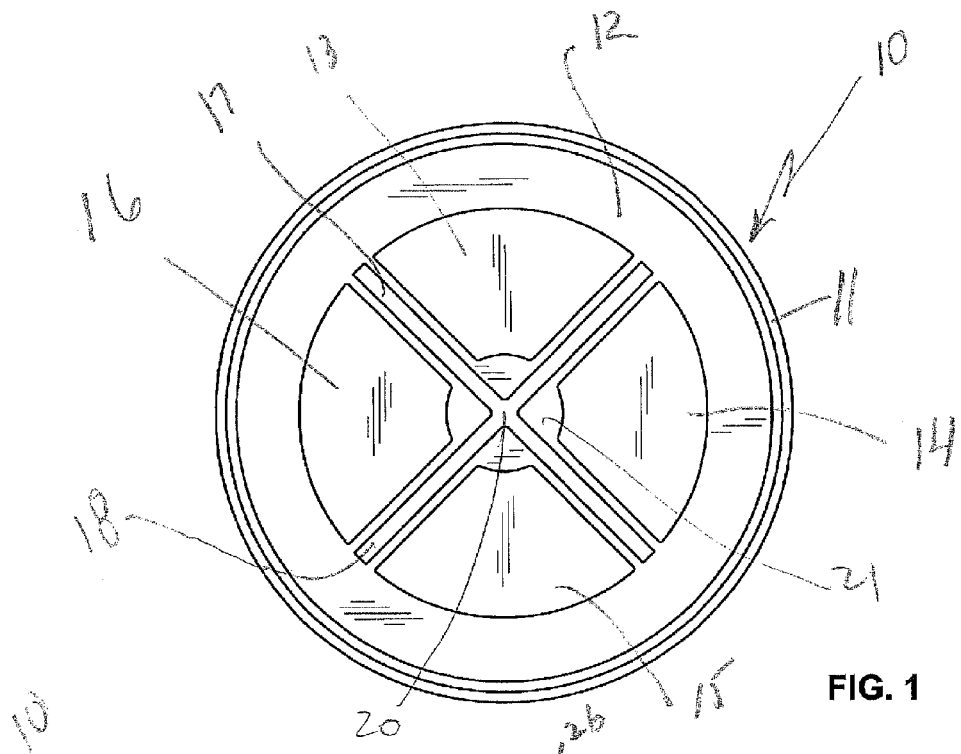
FIG. 1 is a diagrammatic top view of the preferred pet treat holder of the present invention.
Figure 2:
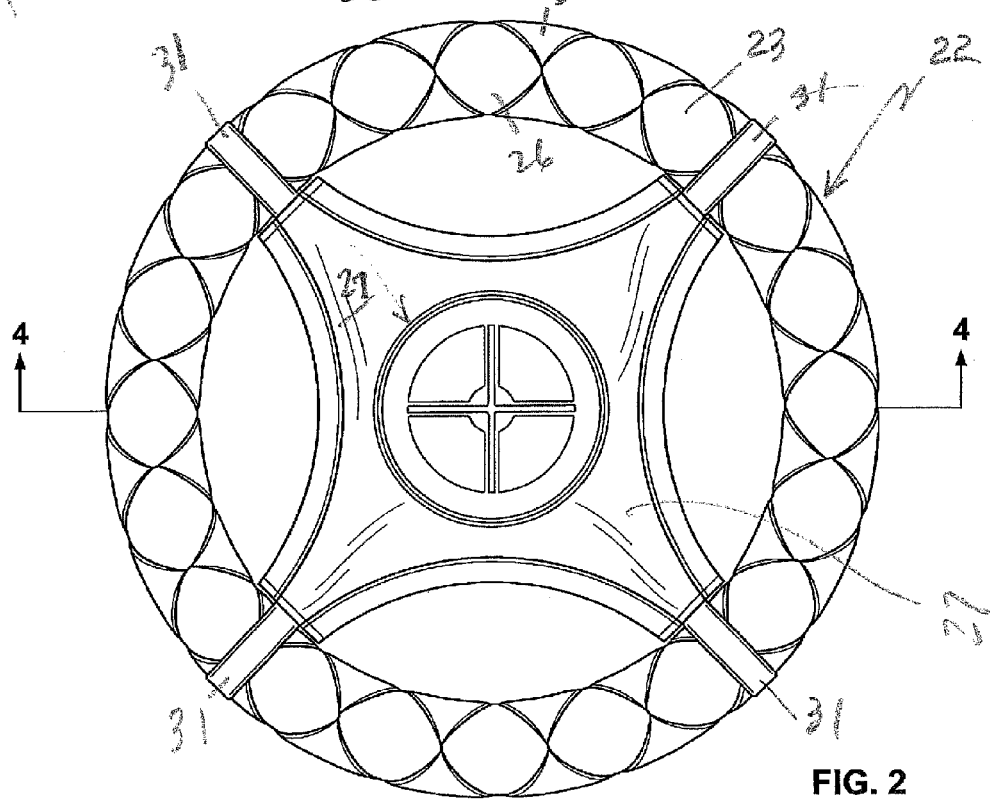
FIG. 2 is a top plan view of one embodiment of a pet toy of the present invention showing the pet toy body having an outer ring and a section of fabric loosely coupled by hoops to the outer ring with the pet treat holder of FIG. 1 shown connected to a central section of fabric in the body of pet toy extending from the outer ring so that the pet treat holder is centrally within the body of the pet toy.

The pet treat dispenser 10 is composed of a flexible material of relatively stiff plastic or rubber formed into a thin disc like member 11 having an annular border 12 circumscribing the perimeter of the holder 10 and four flaps 13, 14, 15, and 16 which may be formed by punching out two narrow intersecting strips of material from the holder 10 to form rectangular openings 17 and 18 which extend cross-wise from the border 12 and intersect one another at a central position 20 in the dispenser 10. The four flaps 13, 14, 15, and 16 form pie sections with the opening 20 at a central location in the holder 10. The opening 20 defines an area in which a treat may be removably placed. The four flaps 13, 14, 15 and 16 are deflected by the placement of a treat which secures the treat in this position until removed therefrom. A small area from each of the four flaps 13, 14, 15, and 16 surrounding the intersecting opening 20 may be removed from each flap to form a central region 21 about the opening 20 in which the flaps are thinner so as to provide greater flexibility in the movement of the flaps 13, 14, 15 and 16 at the central region 21 for the ingress and egress of a treat. Although the pet treat dispenser 10 may be formed using only a single thin disc like member 11 having an annular border 12 it is preferred to construct the dispenser 10 using two identical disk like members 11 assembled in an overlapping relationship to one another with the border 12 of each of the two disk like members 11 arranged in a sandwich fastened on opposite sides to one or two section(s) of fabric 27 extending from the pet toy as shown in the exploded view in FIG. 3. In such case the treat is place in the opening 20 of the dispenser 10 bridging both of the two overlapping disk like members enhancing the gripping ability of the pet treat holder 10 for holding the treat.

Figure 3:
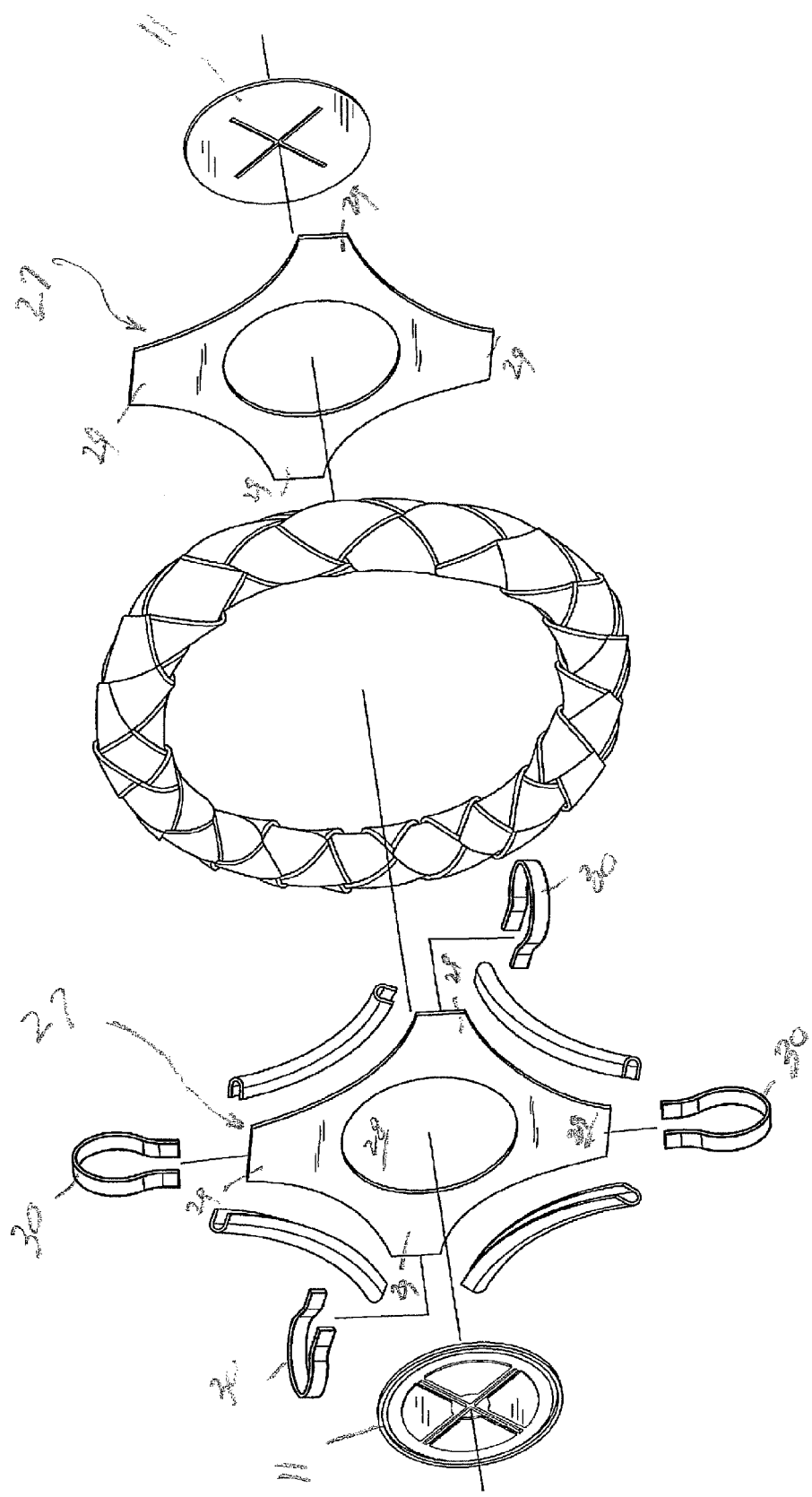
FIG. 3 is an exploded view in perspective of the pet toy shown in FIG. 2.
Figure 4:
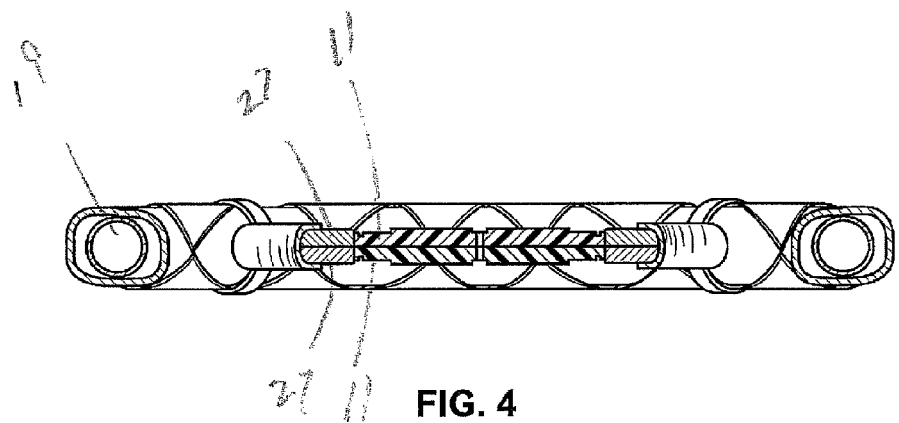
FIG. 4 is front sectional view of the pet toy of FIG. 3 taken along the lines 4-4 in FIG. 2.
Figure 5:
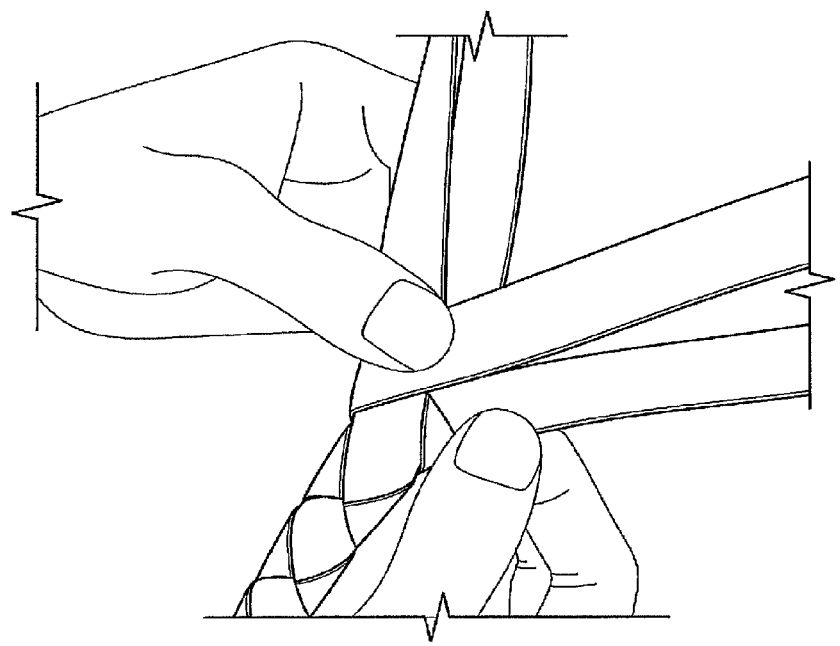
FIG. 5 illustrates how the outer ring shape configuration of FIG. 2 is preferably constructed from separate strips of fabric.

FIGS. 2-5 illustrate a preferred embodiment of a pet toy 22 of the present invention in which a pet treat dispenser 10 is affixed to a fabric section 27 of the pet toy 22 at a central location preferably at or close to its center of gravity. In this embodiment of the invention the pet toy 22 comprises an outer circular ring 23 formed from a plurality of strips of fabric 26, preferably of woven nylon, which are intertwined as shown in FIG. 5 into a plaited spiral geometry having a hollow core 19 as shown in FIG. 4. An exploded view of the pet toy 22 is shown in FIG. 3. Preferably two identical fabric sections 27 each preferably of nylon are stitched from opposite sides to a border 12 of each of two disk like members 11 in a sandwich arrangement for forming the pet treat dispenser 10. Each fabric section 27 has a quadratic shape with a central opening 28 and four identical extended arms 29. Separate pieces of nylon fabric 30 are looped over the outer circular ring 23 forming hoops 31 which are loosely coupled around the ring 24 and then fastened together to the outer end of each of the extended arms 29 of the fabric section 27. An edge portion of fabric 32 may be fastened by sewing to the periphery of the fabric section 27 between the extended arms 29.

Figure 6:
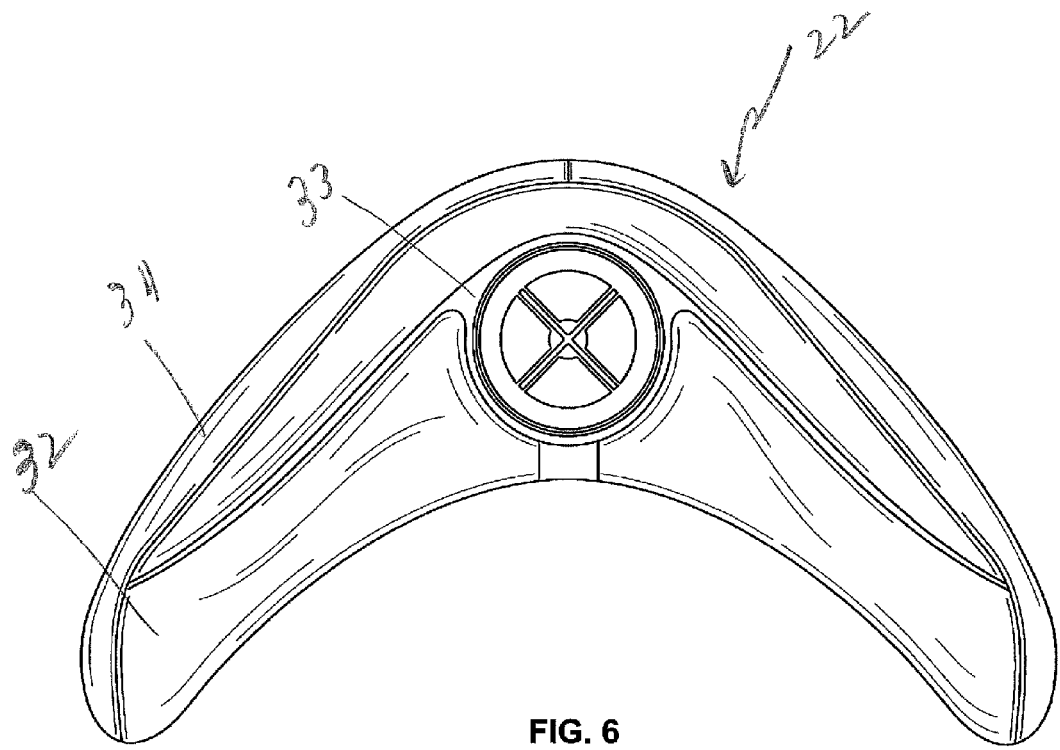
FIG. 6 is a top plan view of another embodiment of the pet toy of the present invention with the body of the pet toy having a boomerang configuration to facilitate hurling the body into the air and with the pet treat holder of FIG. 1 shown connected to the body at a central location.
Figure 7:
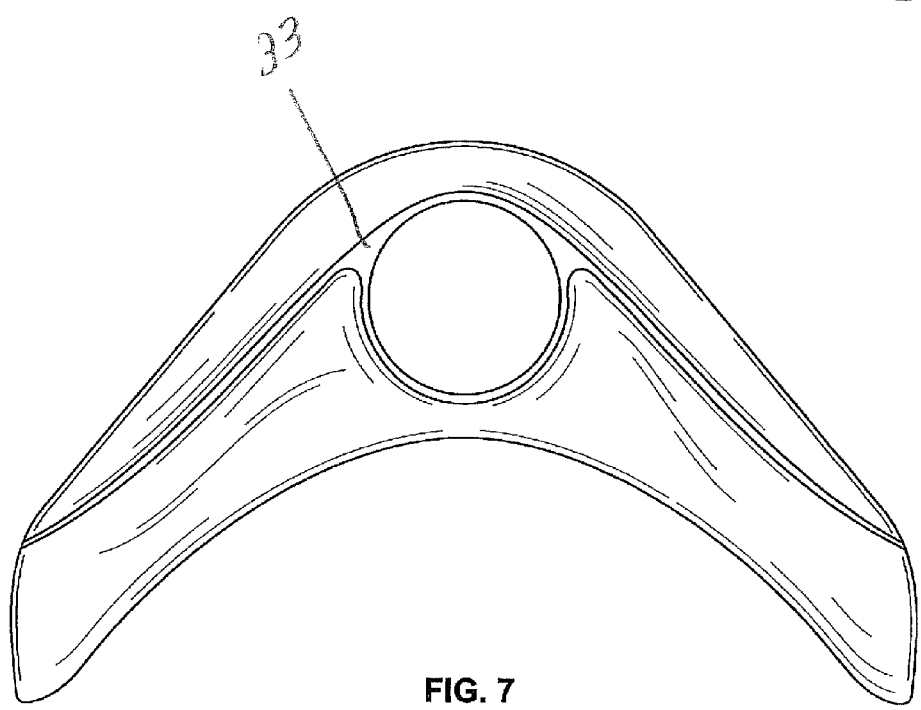
FIG. 7 is a view similar to FIG. 6 without the pet treat holder of FIG. 1.

A second embodiment of the pet toy 22 of the present invention is shown in FIGS. 6 and 7 with the body 32 of the pet toy 22 in the configuration of a boomerang. In this embodiment a pet treat dispenser 10 is attached to the body 32 in a central location approximately representing the center of gravity of the pet toy 22. The dispenser 10 is assembled from two disk like members 11 as shown in FIGS. 1 and 3 with each formed as described above in connection with FIG. 1 from a flexible material of relatively stiff plastic or rubber and stitched around the border 12 to two sections of fabric 33 with each section of fabric 33 extending from an opposite side of the body 32 of the pet toy 22. The assembly of the pet treat dispenser 10 is the same as described in connection with the first embodiment as shown in the exploded view of FIG. 3. The body 32 of the pet toy 22 may be formed from two pieces of fabric representing two opposite sides of the body 32 with each piece of fabric on each opposite side having an extended section of fabric 33 stitched together between the disk members 11 around each border 12 thereof to form the pet treat dispenser 10. The two pieces of fabric forming the body 32 may also be stitched in an overlapping relationship with a cotton filling placed therein before stitching them together. An edge portion of fabric 34 overlies the body 32 and is stitched to the section 33 of the body 32 along the periphery at one end of the pet toy 22.

Referring now to FIGS. 8-10 illustrating another embodiment of the pet toy 22 having three arm like sections 41, 42 and 43 of fabric which radially extend from a pet treat dispenser 10 of FIG. 1 located in the center of the pet toy 22. The pet treat holder 10 is once again assembled from two disk like members 11 as shown in FIGS. 1 and 3 of a flexible material of relatively stiff plastic or rubber. The three arm like sections 41, 42 and 43 have a common design as shown in FIG. 10 with each arm having two opposite sides of fabric 44 with the end portion 46 of each opposite side attached to the pet treat dispenser 10 by stitching the end portion 46 on each opposite side of each arm 41, 42 and 43 between two disk members 11 around each border 12 thereof as shown in FIG. 1 for forming a single pet treat dispenser 10 at the center of the pet toy in the same manner as explained above for the first embodiment in connection with FIG. 3. The two opposite sides of fabric 44 of each arm 41, 42 and 43 may be stitched together around its periphery after placing a cotton filling therein. An edge material 45 may be stitched to the periphery of the fabric 44 around the border of each of the three arms 41, 42 and 43 to form the perimeter of the pet toy.

Figure 12:
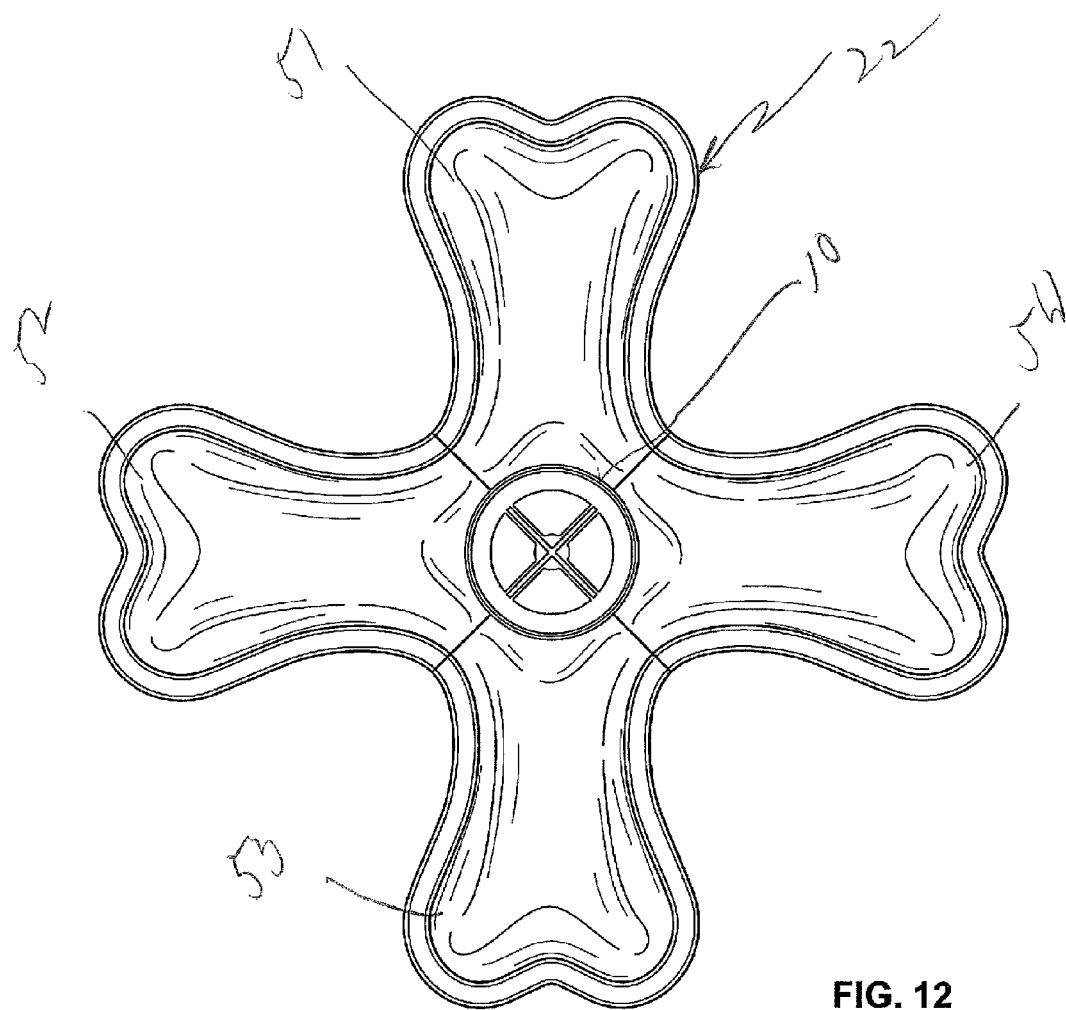
FIG. 12 is a top plan view of a further embodiment of the pet toy of the present invention similar to that of FIG. 9 with the body of the pet toy having four arm like sections of fabric radially extending from a pet treat holder as shown in FIG. 1 located in the center of the body of the pet toy and with each of the arms formed in a manner preferably filled with cotton similar to the arms in FIG. 9.
Figure 13:
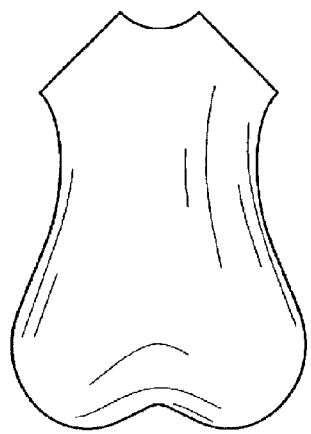
FIG. 13 illustrates one layer of fabric for forming any one of four arms of FIG. 12 to facilitate hurling the pet toy of FIG. 12 into the air.
Figure 14:
FIG. 14 illustrates a section of fabric similar to that in FIG. 10 to be stitched to layers of fabric having the geometry of FIG. 13 for forming any one of four arms of FIG. 12 to reinforce the edges of the arms and to permit each arm to be filled with cotton.

A further embodiment of the pet toy of the present invention is illustrated in FIG. 12-14 and is constructed in a manner similar to the embodiment of FIG. 9 except that the pet toy in this embodiment has four arm like sections 51, 52, 53 and 54 of fabric which radially extend from the pet treat dispenser 10 located in the center of the pet toy 22. The pet treat dispenser 10 is assembled in the pet toy 22 shown in FIG. 12 in the same manner as described above in connection with FIG. 9.

I claim:

1. A pet toy having a configuration adapted for tossing the pet toy into the air comprising, in combination, a pet treat dispenser for dispensing a treat to a pet animal upon accessing the pet toy and a body composed of light weight fabric with the pet treat dispenser affixed to the body of the pet toy at a location at or substantially close to the center of gravity of the pet toy, wherein the body of the pet toy is in a geometrical configuration selected from the group consisting of an annular ring, a diskette shaped geometry, a boomerang shaped geometry and a geometry including a central body portion having a plurality of arms extending outwardly therefrom; and wherein the pet treat dispenser comprises a flexible material having at least two sections with each section comprising two or more flexible layers in a sandwich arrangement overlapping one another and extending from a border area surrounding the perimeter of the pet treat dispenser such that the flexible layer(s) of the sections form a plurality of flaps with each flap being movable relative to the other flap(s) to enable a treat to be removably gripped between the flaps and with the treat being easily removed from the treat dispenser by a pet animal.

2. A pet toy as defined in claim 1 wherein the body of said pet toy comprises one or more piece(s) of fabric material extending from the border area of said pet treat dispenser and being affixed between the overlapping layers in each section of said pet treat dispenser.

3. A pet toy as defined in claim 2 wherein the border area is circular in geometry and wherein said plurality of flaps comprise four substantially equal size flaps of overlapping flexible material symmetrically extending from said border area.

4. A pet toy as defined in claim 3 wherein the four flaps are configured in a pie shape with each flap in a shape having a geometry substantially conforming to the letter V.

5. A pet toy as defined in claim 4 wherein each flap forms an apex in relative close proximity to the apex of the other flaps leaving sufficient space at the approximate intersection of each apex for the insertion and removal of a treat.

6. A pet toy as defined in claim 2 wherein the body of the pet toy further comprises an outer ring connecting said piece(s) of fabric material to said pet treat dispenser.

7. A pet toy as defined in claim 6 wherein said outer ring comprises two strips of fabric intertwined and plaited relative to one another in a spiral geometry forming a circular configuration having a hollow core.

8. A pet toy as defined in claim 7 wherein the piece(s) of fabric material between the outer ring and the pet treat dispenser comprise a plurality of arm sections radially extending from the pet treat dispenser.

9. A pet toy as defined in claim 8 further comprising a plurality of hoops of fabric material in an arrangement loosely coupling the outer ring to an end of each arm section.

10. A pet toy as defined in claim 8 wherein said outer ring is composed of a nylon composition and wherein said plurality of arm sections of fabric material are composed of a nylon composition.

11. A pet toy as defined in claim 10 wherein the plurality of arm sections are substantially equal in size to one another and symmetrically arranged with each arm section having an end covered with fabric material to form an edge at its periphery.

12. A pet toy as defined in claim 11 wherein the border area is circular in geometry and wherein said plurality of flaps are of substantially equal size with each flap composed of at least two overlapping layers of flexible material and with the flaps symmetrically extending from said border area.

13. A pet toy as defined in claim 11 wherein each arm section includes a filling material stuffed therein to increase the volume of each arm section.

14. A pet toy as defined in claim 13 wherein said filling material is cotton.

15. A pet toy as defined in claim 12 wherein said plurality of arm sections comprise three symmetrical arm sections.

16. A pet toy as defined in claim 12 wherein said plurality of arm sections comprise four symmetrical arm sections.

17. A pet toy as defined in claim 2 wherein the piece(s) of fabric material extending from the pet treat dispenser are stitched together to form wing-line arms in the configuration of a boomerang with each extended wing-like arm containing a filling material.

18. A pet toy as defined in claim 17 wherein said filling material is cotton.

* * * * *